B. ROGERS.
REVERSIBLE OFFSET FOR PLOWS.
APPLICATION FILED JULY 12, 1916.

1,203,133.

Patented Oct. 31, 1916.

WITNESSES:
E. O. Berger.
H. Fred Forster.

INVENTOR:
BEN ROGERS.
BY F. C. Bates
HIS ATTORNEY.

UNITED STATES PATENT OFFICE.

BEN ROGERS, OF CUPERTINO, CALIFORNIA.

REVERSIBLE OFFSET FOR PLOWS.

1,203,133.

Specification of Letters Patent. Patented Oct. 31, 1916.

Application filed July 12, 1916. Serial No. 108,838.

*To all whom it may concern:*

Be it known that I, BEN ROGERS, a citizen of the United States, residing at Cupertino, in the county of Santa Clara and State of California, have invented certain new and useful Improvements in Reversible Offsets for Plows, of which the following is a specification.

My invention relates to reversible offset for plows and more particularly to that general class of plows known as orchard plows.

The object of my invention is to provide a reversible offset for plows of simple and durable construction, capable of being used in orchards for plowing close to the trees, or in any other place where close plowing may be required.

A further object is to provide a reversible offset for plows that may be attached to the plow beam of a plow and quickly removed therefrom when not required, and a reversible offset that may be quickly adjusted as the operator may require.

A still further object of my invention is generally to improve this class of devices so as to increase their utility, durability and efficiency.

Further objects and advantages will appear in the following description, it being understood that various changes in form, proportions and minor details of construction may be resorted to within the scope of the appended claim.

Figure 1:
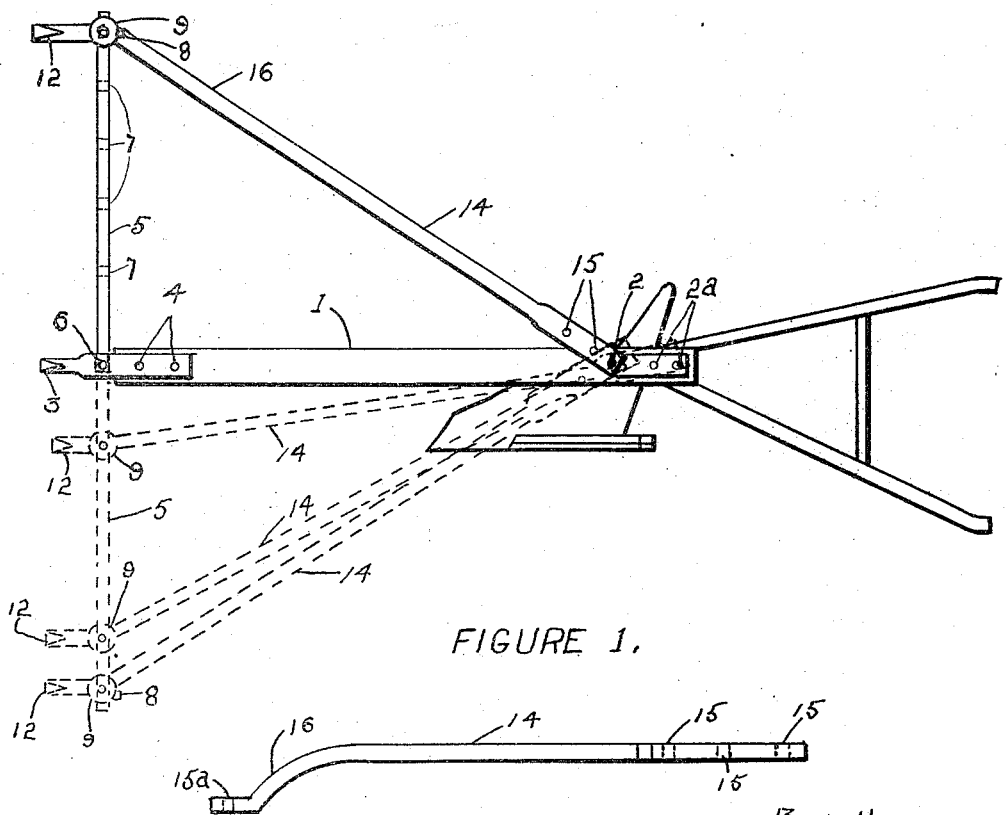
Figure 2:
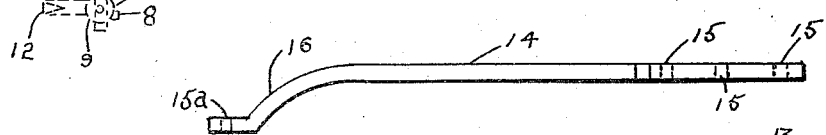
Figure 3:
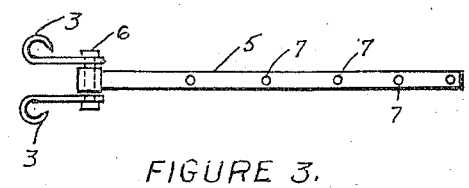
Figure 5:
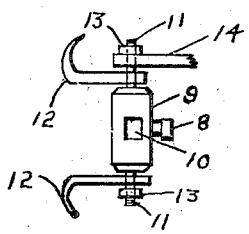
Figure 4:
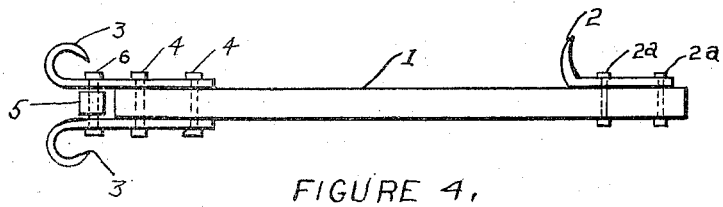

For a full understanding of the invention and the merits thereof, reference is to be had to the following description and accompanying drawings, in which:

Figure 1 is a plan view of a plow with my reversible offset bar attached thereto showing reversible and alternate positions. Fig. 2 is a detail side elevation of the offset arm. Fig. 3 is a detail side elevation of the offset bar, with hooks attached. Fig. 4 is a detail side view of a plow beam showing my offset bar and hook attachments fastened to said plow beam. Fig. 5 is a detail side elevation of the adjustable double stud showing turnable hooks thereon and set screw in place.

Corresponding and like parts are referred to in the following description and indicated in all the views of the drawings by the same numerals.

My improved reversible offset for plows forming the subject matter of the present invention, comprises a plow beam 1, to which is attached hook pin 2 by bolts $2^a$ at the rear end thereof, at the front end thereof is attached hooks 3 by bolts 4, offset bar 5 being turnable on bolt 6 between hooks 3, a plurality of counter-sunk indentations are shown at 7 in offset bar 5, adapted to receive the end of set-screw 8 in adjustable double stud 9, said stud 9 having a hole 10 through the side thereof adapted to fit over offset bar 5 and is adjustable thereon, and held in place by set screw 8, said stud 9 having a threaded portion on each end thereof as shown at 11, on said threaded portion is placed turnable hooks 12, these hooks turn on stud 9 and are held in place on said stud 9 by threaded nuts 13, these hooks 12 are adapted to be attached to, when drawing the plow in an offset position, and may be adjusted on offset bar 5, by stud 9 to any required offset in either position, adjusting bar 14, is shown in one position to the right, and in three positions in dotted lines to the left, bar 14 is connected to stud 9 and is adjustable on hook pin 2 by holes in said bar 14 at 15, said bar 14 having a hole through its outer end at $15^a$ adapted to connect with stud 9, and an offset 16 near its outer end for the purpose of passing hooks 3 when said bar 5 is reversed in either direction. A plurality of studs 9 and hooks 12, may be placed on bar 5 when more than one team of horses is required in offset plowing, as shown in dotted lines to the left.

My improved reversible offset for plows is simple in construction, can be secured to any ordinary plow beam, is of few parts, and can be manufactured at a small initial cost.

It is evident that slight changes in the construction of the different parts might be resorted to without departing from the spirit of my invention, and hence I would have it understood that I do not wish to limit myself to the exact construction shown and described, but consider myself at liberty to make such slight changes and alterations as fairly fall within the spirit and scope of my invention.

Having fully described my invention, what I claim as new and desire to secure by Letters Patent, is—

In a reversible offset for plows, the combination of a hook pin fastened to the rear end of a plow beam, hooks fastened at the front end of said plow beam, an offset bar being turnable between said hooks, an adjustable double end stud, an opening through said stud, said stud being adapted to fit over said offset bar and is adjustable thereon, hooks positioned on said double end stud, adapted to be attached to when drawing a plow in the offset position either right or left, an adjusting bar, means for connecting said adjusting bar with said double end stud, and said hook pin, the same being adjustable on said hook pin, an offset in said adjusting bar, adapted to pass said hooks at the front of said plow beam when said bar is being reversed, in offset plowing.

In testimony whereof I affix my signature in presence of two subscribing witnesses, this 7 day of July, 1916.

BEN ROGERS.

Witnesses:
E. L. WESTERFIELD,
T. R. BEVERSON.

Copies of this patent may be obtained for five cents each, by addressing the "Commissioner of Patents, Washington, D. C."